Nov. 7, 1950    J. T. ABBAS    2,529,361
FUEL TANK LOCK

Filed Nov. 7, 1946    2 Sheets-Sheet 1

INVENTOR.
JOSEPH T. ABBAS
BY
ATTORNEY

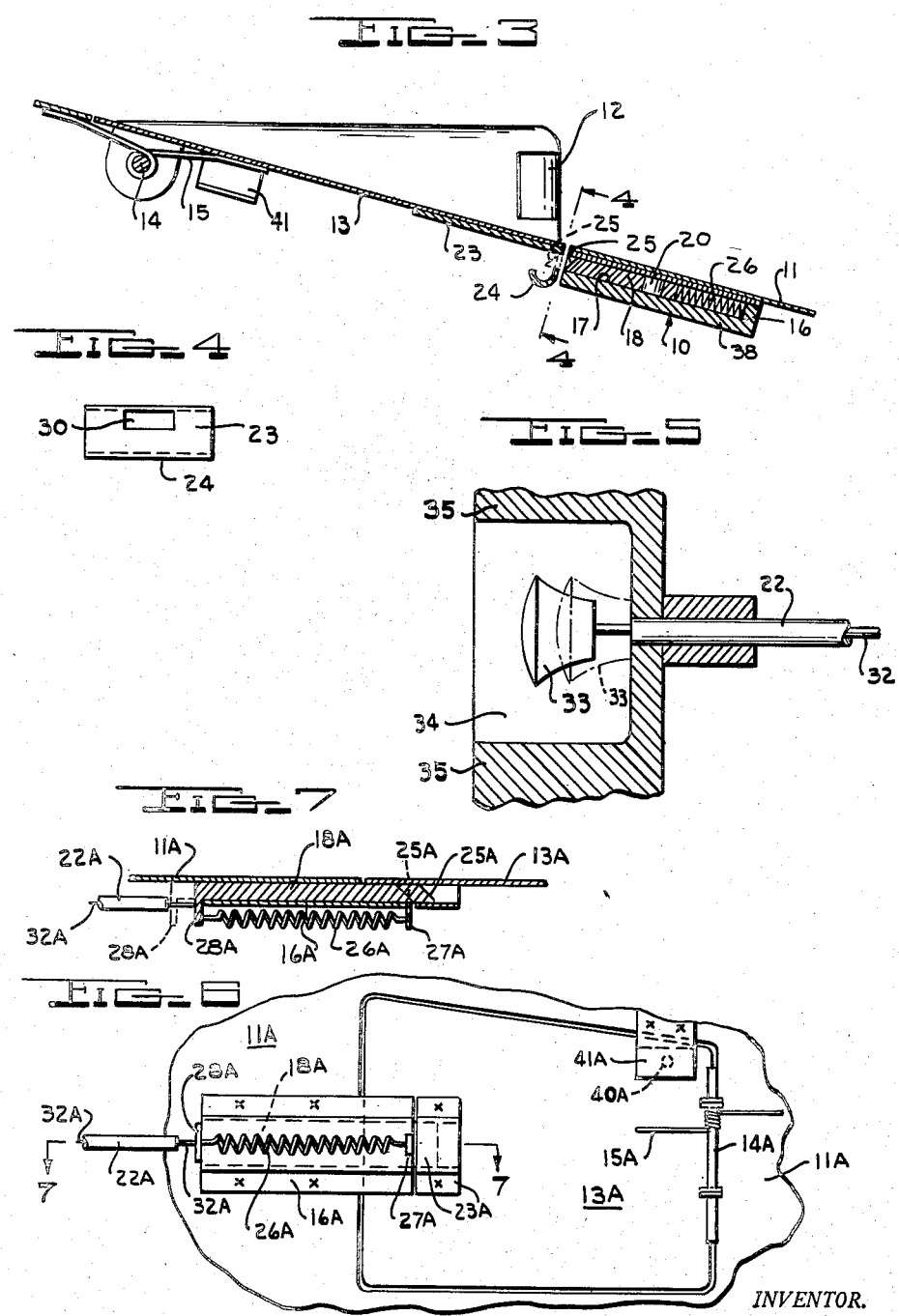

Patented Nov. 7, 1950

2,529,361

UNITED STATES PATENT OFFICE 2,529,361

FUEL TANK LOCK

Joseph T. Abbas, Detroit, Mich.

Application November 7, 1946, Serial No. 708,349

1 Claim. (Cl. 292—166)

The present invention relates to a remote control lock protection for an automobile fuel supply and in particular to a lock for the access fender door leading to the fuel tank filling spout.

Various remote control means operatable from the dash or near the driver's seat have been provided for locking and unlocking the fuel tank spout cap so as to avoid the inconvenience of a key lock. Besides the common difficulty of providing an economical fuel cap lock which cannot be readily pried off, such remote control devices suffer several inherent disadvantages. In order to couple an operating lever on the dash with a fuel cap lock at the rear of a conventional automobile, a lengthy and expensive linkage is required. A flexible cable, for example, must necessarily bend around several pulleys and supports and ordinarily extends downward from the fuel tank cap, under the frame of the car, upward under the hood for the motor, and backward to the dash. The difficulty and expense of protecting such an extensive length of cable from tampering is obvious. Hardened sheathing is conventionally employed to protect the cable but the friction between the cable and sheath resulting from the length of the cable and its numerous changes in direction render such an arrangement highly unsatisfactory. The cable frequently binds within its sheath so that difficulty is experienced both in locking and unlocking the lock.

Primary objects of the present invention are to provide theft protection for the fuel supply of an automobile by providing a convenient, simple, and reliable lock for the hinged door which normally constitutes a part of the automobile fender and which provides access to the fuel tank opening, the lock being particularly adapted for unlocking by remote control from within the automobile and being otherwise particularly designed to foil tampering.

Other objects are to provide a locking mechanism for the said hinged access door, which may be economically manufactured and which may be readily installed as a part of the original automobile equipment.

Other objects are to provide an improved remote control unlocking linkage for a lock of the character described, thereby providing a highly efficient, readily protected, and economical remote control unlocking linkage of minimum length which may be conveniently located within inaccessible portions of the automobile body to avoid tampering, which may be operated by a lever offset within the rear door jamb of the rear door of the automobile, and which also provides for an essentially direct pull without turns or bends between the said unlocking lever and the lock.

Other objects are to provide a lock of the character described which may be conveniently locked merely by closing said hinged access door, which provides a conveniently located signal light on the automobile dash to indicate whether the said hinged access door is closed or not, and which is particularly adapted to avoid being clogged with dirt or water.

Other objects of the invention will appear in the following description and appended claims, reference being had to the accompanying drawings forming a part of this specification wherein like reference characters designate corresponding parts in the several views.

In the drawings:

Fig. 3 is a fragmentary section of the lock and fender taken in the direction of the arrows essentially along the line 3—3 of Fig. 2.

Fig. 4 is a fragmentary section taken in the direction of the arrows essentially along the line 4—4 of Fig. 3 and showing the striker plate.

Fig. 5 is an enlarged fragmentary section through the rear door jamb and taken in the direction of the arrows essentially along the line 5—5 of Fig. 1.

Fig. 6 is a fragmentary bottom view of an automobile fender and hinged access door to the fuel tank opening and showing another embodiment of the lock of the present invention.

Fig. 7 is a fragmentary section of the lock and fender taken in the direction of the arrow essentially along the line 7—7 of Fig. 6.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
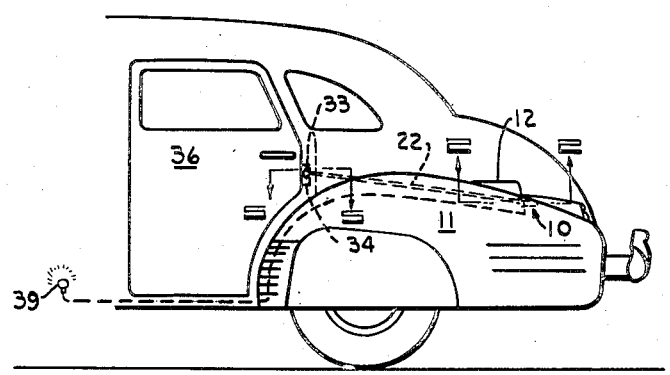
Fig. 1 is a fragmentary side elevation of an automobile employing a lock of the present invention.

A lock indicated generally by the numeral 10 and embodying the present invention is shown in relation to an automobile, Fig. 1, on the underside of the shell of the body portion 11 which normally constitutes the automobile fender. The turn signal light 12, essentially as located on a modern Cadillac, is indicated as an aid in orientating Fig. 3. The hinged door 13, Fig. 2, in the body portion 11 provides access to the fuel tank opening which is normally located below the rear portion of the fender 11. The door 13 is hinged to the adjacent fender 11 or other portion of the automobile body, as by the hinge 14, which provides the wire spring 15 to spring the door 13 open when the lock 10 is unlocked.

Figure 2:
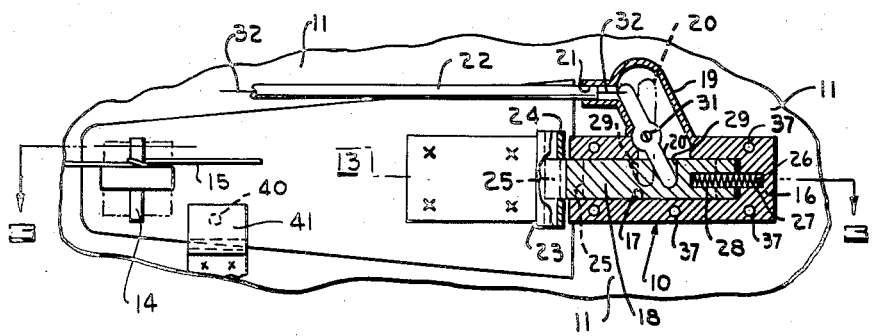
Fig. 2 is an enlarged fragmentary bottom view of the lock and fender, in the direction of the arrows essentially along the line 2—2 of Fig. 1 and showing a partially sectioned view of the lock adapted for the hinged access door to the fuel tank opening.

Details of the lock 10 are shown in Figs. 2, 3 and 4 wherein a housing 16, secured to the underside of the body shell 11, provides the bolt channel 17 for the slidable bolt or latch 18, the bay 19 for the pivotal lever 20, and the cable opening 21 into which is secured the cable sheath 22. A striker or keeper 23, preferably secured to the underside of the door 13 by spot welding, provides the downward extending J-shaped curved guard 24 which engages the chamfered end 25 of the bolt 18 and forces the bolt 18 back into the bolt channel 17 against the resiliency of the spring 26 when the door 13 is closed, Fig. 3. The spring 26 is held in place by fitting at one end into the recess 27 of the housing 16 and at the other end into the recess 28 of the bolt 18.

One arm of the pivotal lever 20 engages the bolt 18 by fitting into the bolt notch 29 and slides the bolt 18 in and out of the striker opening 30, Fig. 4, by pivoting on the vertical pivot pin 31 of the housing 16. The other arm of the lever 20 is secured to one end of the cable 32. The far end of the cable 32 is secured to the remote control operating handle 33, Fig. 5, within the offset 34 of the rear door jamb 35 of the rear door 36. Preferably the housing 16 provides the plurality of pin holes 37 so that a cover member 38, having a corresponding plurality of pins for the pin holes 37, may be fitted over and completely cover the housing 16 and bay 19 and be spot welded in place. Thus the operating mechanism of the lock is effectively protected from dust or weather.

A signal light 39 is conveniently located on the automobile dash and is electrically connected with the normally closed switch 40, which latter is secured to the bracket 41 of the body portion 11 just below the hinged door 13 so as to be opened by contact with the door 13 when the door 13 closes and to be closed when the door 13 opens.

In order to unlock the lock 10, the door 36 is opened and the handle 33 is pulled from the locked position shown in phantom, Fig. 5, to the unlocked position whereat the cable 32 pulls the lever arm 20 from the locked position, shown in phantom Fig. 2, to the unlocked position. By virtue of the extended arm of the lever 20 within the bolt notch 29, the bolt 18 is moved against the tension of the spring 26 from locking engagement with the striker 23, shown in phantom, Figs. 2 and 3, to the unlocked position. Upon release of the bolt 18 from the striker 23, the door 13 is swung open by the spring 15, and the signal light 39 is turned on.

As soon as the pull on handle 33 is released, spring 26 forces the above described linkage back to the locked position. The pivotal movement of the lever 20 is limited by contact with the sides of the housing 16 and bay 19.

When the door 13 is being closed, the curved guard 24 engages the chamfered edge 25 and forces the bolt 18 back into the housing 16. When the door 13 is completely closed, the bolt 18 slides under pressure of the spring 26 into the striker opening 30 and locks the door 13. At the same time switch 40 is opened and the dash light 39 goes off. It is to be noted that when the bolt 18 is in the locked position shown in phantom, Fig. 3, its chamfered end 25 is completely through the striker opening 30. Consequently once the lock 10 is locked, a knife blade or other thin object cannot be forced against the bevel 25 so as to push the bolt 18 to the unlocked position.

A modification of the present invention which does not employ the direction reversing mechanism involving the lever 20 of Fig. 2, but which is otherwise essentially similar in function and purpose to the lock 10, is shown in Figs. 6 and 7. Similarly to the hinged door 13, the hinged door 13A also provides access to the fuel tank opening of an automobile and comprises a portion of the body shell 11A to which it is hinged by the hinge 14A. The wire spring 15A springs the door 13A open when the lock 10A is unlocked.

In this instance a simplified channel housing 16A, open at each end, is spot welded to the underside of the body shell 11A and holds the slidable bolt 18A within its channel and directly adjacent the underside of the body shell 11A. The spring 26A is secured at one end to the downward projecting stud 27A of the housing 16A and is secured at the other end to the downward projecting stud 28A of the bolt 18A. By pulling the cable 32A which is within the sheath 22A and secured at one end to the stud 28A, the bolt 18A is withdrawn as shown in phantom, Fig. 7, against tension of the spring 26A from the striker 23A, which latter is secured to the underside of the door 13A. Obviously in both this and the former embodiment of the present invention, the striker may be secured to the fender or automobile body and the lock housing may be secured to the hinged door.

A dash light switch 40A is secured to the bracket 41A, which in turn is welded to the body portion 11A, and is adapted to be opened by contact with the door 13A when said door 13A is closed, and to be closed when released from contact with door 13A upon opening of said door 13A.

When the door 13A is open and cable 32A is relaxed, the chamfered end 25A of the bolt 18A is forced out of the channel housing 16A by the tension of the spring 26A. Upon closing the door 13A, the lower guard of the striker 23A engages the chamfered end 25A and depresses the bolt 18A. As soon as door 13A is closed, bolt 18A springs into locking engagement with the striker 23A, and the door 13A is locked.

Several advantages, among others, are at once apparent in the above described structure. The simplicity of construction of the few parts involved permits economical manufacture by mass production methods and facilitates assembly of the lock. It is proposed that the lock will be installed as original equipment on the automobile and hence may be conveniently assembled and welded to the body portion 11 before the body is painted. Likewise the cable 32 and sheath 22 may be conveniently installed within the automobile body during its manufacture.

It is to be observed that a primary factor in the utility and practicability of the present invention and the simplified and economically manufactured structure thereof, is its inaccessibility to tampering, weather and dirt from the road once the hinged fender door is closed. The location of the lock on the underside of the fender or corresponding automobile body portion above the fuel tank is protected and sheltered from below by the fuel tank and from above by the fender. The weather-proofing bead conventionally employed by most automobiles around the door 13 prevents the insertion of a pry or jimmy between the hinged door and adjacent body portion and also protects the lock from rain and dust.

By locating the remote control operating lever for the pull-cable within the rear door jamb of the rear door of the automobile, an essentially straight pull is achieved for the pull-cable through the body panels of the automobile. Not only is the cable made inaccessible to tampering, but a minimum length thereof is required to provide a remote control unlocking means accessible from within the automobile. The relative absence of bends or turns in the cable and the possibility of a direct pull thereon insures reliable and facile operation of the lock.

Thus by locking the hinged door which permits access to the automobile fuel tank opening, I have provided a reliable lock which is highly inaccessible to tampering, dirt, and weather, and which accordingly lends itself to simplicity of design and structure without sacrificing operating efficiency or protection, being thereby manufactured and installed with optimum economy. Further by the disclosures and description above, I have provided a convenient, highly efficient, and tamper-proof remote control unlocking means for locks of the class of the present invention, which unlocking means is conveniently operable from within the automobile, is inaccessible to tampering, requires a minimum linkage between the lock and the operating handle and accordingly requires a minimum expense for materials, and permits a cable or other linkage between the operating handle and lock to extend in essentially a straight line without bends or turns so as to assure optimum operating efficiency.

I claim:

A latch adapted to cooperate with a keeper, comprising a bolt housing, a bolt opening and a cable opening in said housing, a slidable bolt essentially enclosed by said housing and being slidable therein for release from the keeper or to project through said bolt opening for locking engagement with the keeper, resilient means to urge said bolt into locking engagement with the keeper, means to release said bolt from the keeper against the tension of said resilient means and comprising a pivotal lever engaged with said bolt for slidable movement thereof and being enclosed within said housing, handle means, and means to release said bolt from the keeper by operation of said handle means and comprising a flexible pull-cable entering said housing through said cable opening and being operatively coupled between said pivot lever and said handle means, said pull-cable and the axis of said cable opening being substantially in a direct line between said handle means and said pivot lever.

JOSEPH T. ABBAS.

REFERENCES CITED

The following references are of record in the file of this patent:

UNITED STATES PATENTS

| Number | Name | Date |
|---|---|---|
| 472,886 | Johnson | Apr. 12, 1892 |
| 1,006,609 | Wallingsford | Oct. 24, 1911 |
| 2,035,895 | Kelly | Mar. 31, 1936 |
| 2,088,786 | Gilbert et al. | Aug. 3, 1937 |
| 2,145,968 | Bozarth | Feb. 7, 1939 |